No. 781,770. PATENTED FEB. 7, 1905.
J. J. FLAHERTY, DEC'D.
A. J. FLAHERTY, ADMINISTRATRIX.
DEVICE FOR WASHING BOTTLES.
APPLICATION FILED AUG. 24, 1904.

2 SHEETS—SHEET 2.

Witnesses.
E. E. Wiswall
H. A. Curtis

Inventor:
John J. Flaherty dec'd.
Annie J. Flaherty.
Administratrix.
by F. Curtis. Attorney.

No. 781,770.

Patented February 7, 1905.

UNITED STATES PATENT OFFICE.

ANNIE J. FLAHERTY, OF SOUTH BOSTON, MASSACHUSETTS, ADMINISTRATRIX OF JOHN J. FLAHERTY, DECEASED, ASSIGNOR TO LOUIS A. CURTIS, OF ROSLINDALE, MASSACHUSETTS.

DEVICE FOR WASHING BOTTLES.

SPECIFICATION forming part of Letters Patent No. 781,770, dated February 7, 1905.

Application filed August 24, 1904. Serial No. 222,200.

*To all whom it may concern:*

Be it known that I, ANNIE J. FLAHERTY, a citizen of the United States, residing at South Boston, in the county of Suffolk and Commonwealth of Massachusetts, am the administratrix of the estate of JOHN J. FLAHERTY, deceased, late of said South Boston, who invented a new and useful Device for Washing Bottles, of which the following is a specification.

This invention relates to means for enabling the interior of a bottle or kindred vessel to be thoroughly and expeditiously cleansed; and it consists in certain mechanical construction and combination of parts to be hereinafter described.

Figure 1:
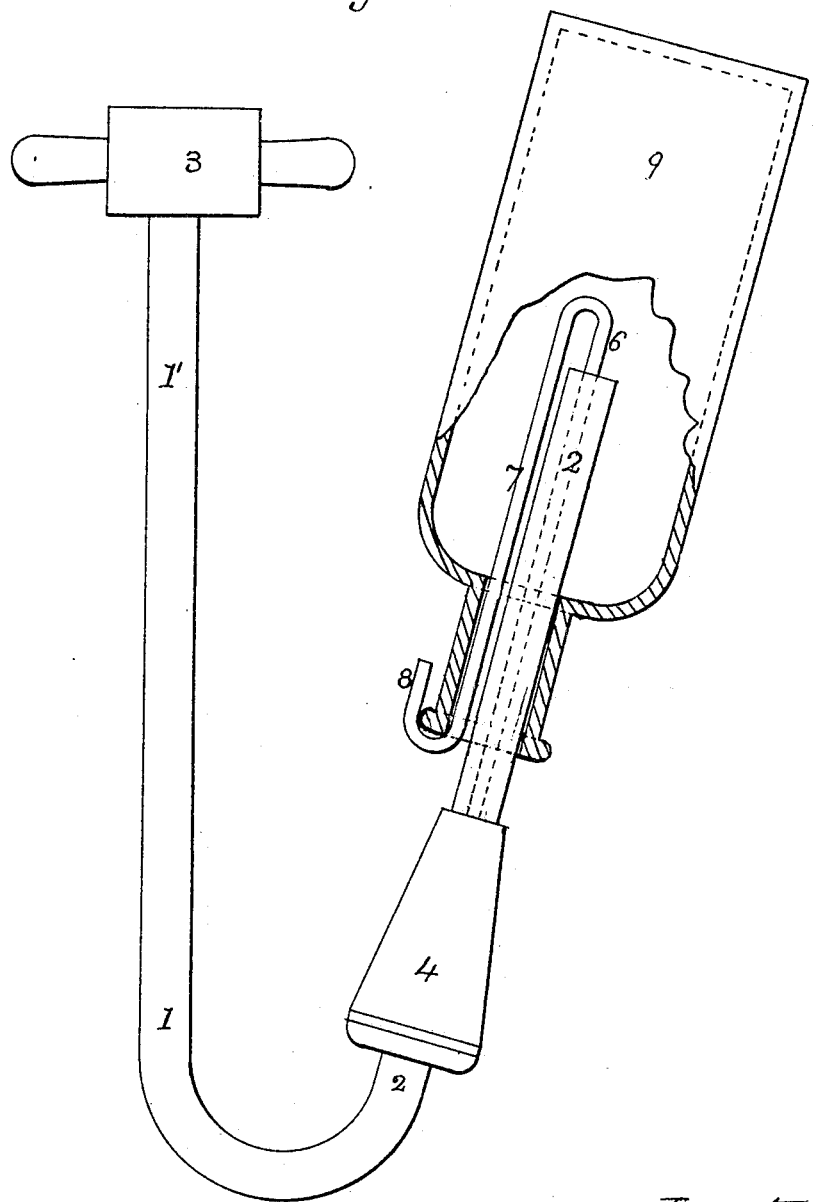
Figure 2:
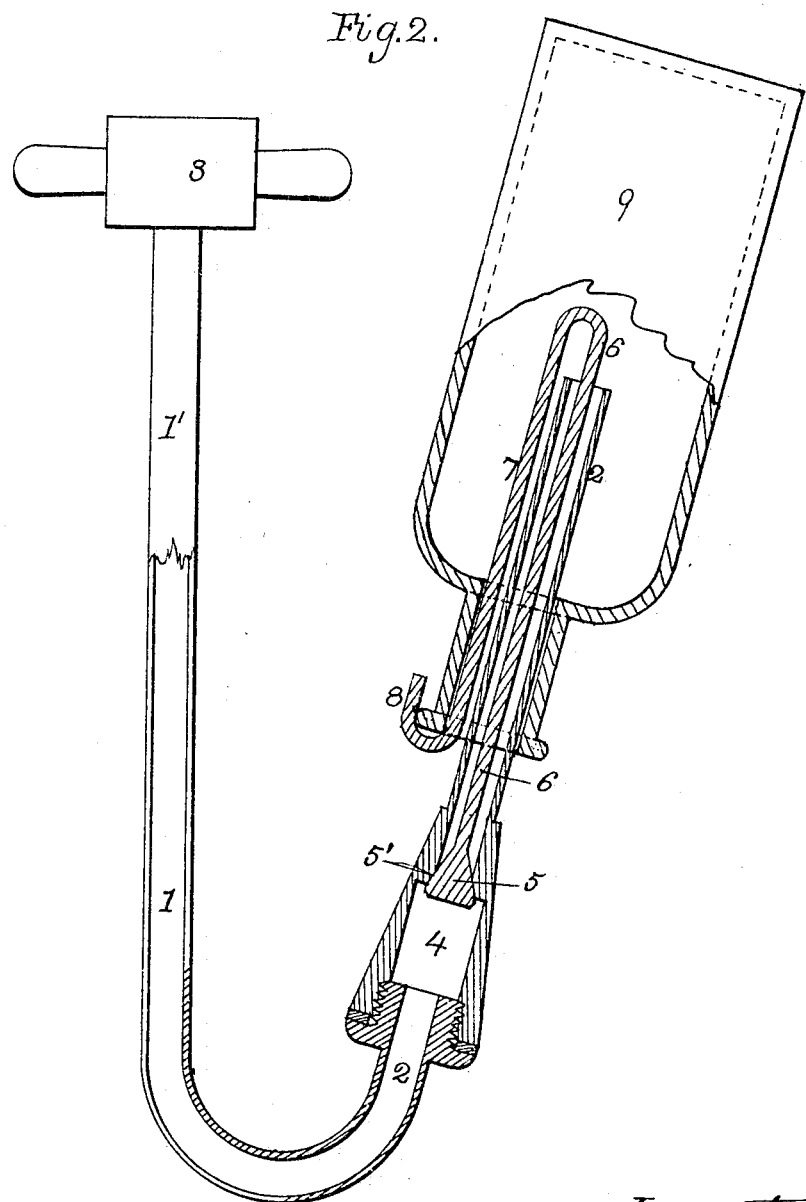

The drawings accompanying this specification represent in Figure 1 an elevation, and in Fig. 2 a vertical section, of a device containing said invention.

In the drawings, 1 denotes the body of the device, consisting of a tube fashioned into the form of an attenuated U, one arm 1' of which constitutes the inlet portion and 2 the outlet portion thereof, the former being furnished at its upper end with a suitable coupling 3, whereby the device may be connected with a water-supply under pressure, preferably by means of an ordinary faucet. The branch or arm 2 is open at top and is formed at bottom with a valve-chamber 4, which contains a valve 5, operating with a seat 5' in the top of said chamber to govern the flow of water through the device, the valve being provided with a stem 6, which extends upward through and somewhat above the top of said arm 2 and is then given a downward turn 7, which terminates in a stirrup 8, adapted to receive the rim of the mouth of a bottle 9, inverted, as shown in dotted lines in the drawings.

The above description embraces the mechanical construction of a bottle-washing device containing said invention, the operation of which is as follows: When a bottle is to be cleansed, it is placed, mouth down, over and so as to inclose the upper part of the arm 2 of the pipe 1 and the valve-stem 7 and is lowered until its mouth abuts against the stirrup or lip 8, when a slightly further lowering of the bottle results in the opening of the valve 5 and water being permitted to enter and cleanse the bottle and escape by the mouth of the latter. As the bottle is being removed the valve 5 is closed automatically by the pressure of the water and flow of the latter through the device cut off.

The object in giving a reverse bend to the pipe 1 is that by so doing the device may be connected with an ordinary faucet, thereby avoiding the necessity of providing a special connection with the water-supply.

The tubular part 2 is, in effect, a discharge-nozzle supplied by the water-pipe 1. The mere extension of the valve-stem 6 beyond the end of the said nozzle would not enable the valve to be operated by hand when such action is desired while the nozzle is within the bottle; also, it would not provide for automatic valve opening unless the bottle were thrust for nearly its whole length on the said nozzle, bringing the bottom of the bottle in contact with said valve-stem. By bending the valve-stem and extending the part 7 rearward along the said nozzle the operator is permitted to open the valve at will when the nozzle has been inserted but slightly in the bottle, thus providing for more efficient washing of that part of the bottle near the neck, also of the middle part of the bottle; but if this be not done the pressure of the bottle-neck on the hooked part 8 of the said stem will open the bottle without any part of the nozzle or stem passing the middle point thereof. These provisions make the apparatus practicable and satisfactory for bottle-washing, it being very desirable to slip the bottles on and off as quickly as possible without need for fitting the whole length of each on the nozzle; also to insure perfect cleaning of all parts of the interior and to regulate the point of internal discharge at will. Moreover, it is best to spare the bottom of the bottle the shock of striking on the nozzle and to avoid the risk of bending, loosening, or unduly wearing the latter. These desiderata are accomplished without impeding the entry and removal of the nozzle and valve-rod through the neck of the bottle.

What is claimed is—

1. In bottle-washing apparatus, the combination of a water-pipe, an elongated discharge-nozzle and valve-seat with a valve adapted to fit said seat and close said nozzle and a valve-stem extending from said valve through and beyond the said nozzle and bent backward exterior of and parallel to the same in order that it may pass through the neck of a bottle and be operated at will by hand substantially as set forth.

2. In bottle-washing apparatus, the combination of a water-pipe, elongated discharge-nozzle and valve-seat with a valve adapted to fit said seat and close said nozzle and a stem which extends through and beyond the said nozzle and is provided with an exterior part 7 extending back parallel to the said nozzle and having a terminal hooked part 8 adapted to receive the neck of a bottle and be operated thereby for opening the valve substantially as set forth.

ANNIE J. FLAHERTY,
*Administratrix of the estate of John J. Flaherty, deceased.*

Witnesses:
F. CURTIS,
H. A. CURTIS.